(12) United States Patent
Van Tran et al.

(10) Patent No.: US 7,512,106 B2
(45) Date of Patent: Mar. 31, 2009

(54) TECHNIQUES FOR DISTRIBUTING ROUTING INFORMATION USING MULTICASTS

(75) Inventors: Thuan Van Tran, Cary, NC (US);
Donnie Van Savage, Raleigh, NC (US);
Donald Slice, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 11/497,147

(22) Filed: Aug. 1, 2006

(65) Prior Publication Data

US 2008/0031244 A1 Feb. 7, 2008

(51) Int. Cl.
*H04Q 7/20* (2006.01)
(52) U.S. Cl. ........................ 370/338; 370/401; 370/390; 370/356; 455/428
(58) Field of Classification Search ......... 370/351–356, 370/387–392, 255, 238, 400–401, 432, 256, 370/338–350; 709/223, 238–240; 455/403, 455/445, 428, 560
See application file for complete search history.

(56) References Cited

U.S. PATENT DOCUMENTS

| | | | |
|---|---|---|---|
| 5,519,704 A * | 5/1996 | Farinacci et al. ............ 370/402 |
| 6,182,147 B1 | 1/2001 | Farinacci |
| 6,269,085 B1 | 7/2001 | Provino et al. |
| 6,529,882 B1 | 3/2003 | Park et al. |
| 7,388,862 B2 * | 6/2008 | Tran et al. .................... 370/389 |
| 2004/0039839 A1 * | 2/2004 | Kalyanaraman et al. .... 709/238 |
| 2005/0163045 A1 * | 7/2005 | Randriamasy .............. 370/229 |
| 2007/0192451 A1 * | 8/2007 | Tran et al. .................... 709/223 |
| 2007/0237095 A1 * | 10/2007 | Yang et al. ................... 370/254 |
| 2007/0237142 A1 * | 10/2007 | Yang et al. ................... 370/390 |
| 2008/0031236 A1 * | 2/2008 | Yang et al. ................... 370/389 |

OTHER PUBLICATIONS

B. Cain, et al., Internet Group Management Protocol, Version 3, rfc3376.txt, Oct. 1, 2002, Publisher: www.ietf.org, Published in: Internet, 53pp.

* cited by examiner

*Primary Examiner*—Kamran Afshar
(74) *Attorney, Agent, or Firm*—Patent Capital Group (57) ABSTRACT

Techniques for sending routing data include sending first routing data in a first multicast packet to a number N of adjacent nodes. It is determined whether different routing data is ready to be sent in a different multicast packet. If so, then a number M of adjacent nodes from which acknowledgment messages have been received, and whether M exceeds a threshold, is determined. If so, then a Conditional-Receive (CR) method is invoked in which a multicast message is sent which identifies each of a number L=N−M of laggard adjacent nodes. The laggard adjacent nodes are thus notified to ignore the different multicast packet. If it is determined that M does not exceed the threshold, then additional acknowledgement messages are received while waiting until M does exceed the threshold before the CR method is invoked. The threshold is greater than or equal to 1.

16 Claims, 7 Drawing Sheets

TECHNIQUES FOR DISTRIBUTING ROUTING INFORMATION USING MULTICASTS

BACKGROUND OF THE INVENTION

1. Field of the Invention

The present invention relates to using multicasts to distribute information to multiple nodes in a network; and in particular to determining a break point between using a multicast and unicasts to improve performance during distribution of routing information among adjacent nodes.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Communications between nodes are typically effected by exchanging discrete packets of data. Information is exchanged within data packets (also called messages herein) according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange. For many protocols, the destination of a packet can include data that indicates a unique identifier for a particular destination node, such as a network address, and the packet is termed a unicast packet; or the destination can include a special code that indicates the packet is directed to any recipient node, and the packet is termed a "multicast" packet. Such a special code is called the multicast destination code.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A routing protocol only exchanges control plane messages used for routing data packets sent in a different routed protocol (e.g., IP). A portion of a network under the network administration of a single authority, such as an enterprise or Internet service provider (ISP) is called a domain or an autonomous system (AS). To reduce the consumption of network resources and improve scalability, some routing protocols send only summarized routing information. Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols such as the intermediate system to intermediate system (IS-IS) protocol and the open shortest path first (OSPF) protocol. Another IGP, developed by Cisco Systems of San Jose, Calif. for use in its routers, is the Enhanced Interior Gateway Routing Protocol (EIGRP). Some of the link-state protocols divide an autonomous system into multiple areas, flood all data for a unified routing database within an area, but send only summarized information between areas. Some IGPs, like EIGRP, send only summary information from each intermediate network node in the autonomous system.

EIGRP currently uses reliable multicast to transport routing information between a sending network node and all its adjacent neighbor nodes (sometimes called neighbors or peers) over one or more interfaces on the sending node. This reliable multicast system relies on the sending router sending a single multicast data packet, and waiting for some specified period of time called a multicast flow time (learned dynamically through network operation), for the neighbors that have received the routing information to acknowledge receipt of the information with an acknowledgement (ACK) data packet. Because receipt of the multicast data packet is acknowledged by the recipients with an ACK data packet, the multicast is called a reliable multicast.

If a neighbor does not acknowledge the receipt of this information within the multicast flow time, the neighbors that have replied are placed in a special state, called the conditional receive state, so they may continue to receive routing information through multicasts. Other routers are informed to ignore the additional multicasts.

That is, instead of waiting for all ACK messages before sending the next multicast, EIGRP places multicast packets on the one or more interfaces with its neighbors using a timer called a multicast flow timer. The value indicated in the multicast flow timer is derived from the mean Smooth Round Trip Time (SRTT) of all neighbors on an interface. When there are large numbers of neighbors which have a wide range of SRTTs, the multicast flow timer value is large, forcing EIGRP to pace the multicast packets very slowly. As a result, the faster neighbors are penalized by the slower neighbors.

Under normal condition, EIGRP waits for acknowledgements from all neighbors before sending the next reliable multicast packet. If the multicast flow timer expires and EIGRP is ready to send the next packet when only a subset of neighbors have acknowledged the previous multicast packet, EIGRP enters a Multicast Exception condition. Under this condition, EIGRP continues to send the next multicast packet rather than waiting for all ACK messages. A method called Conditional-Receive (CR) is invoked to instruct the laggard neighbors to not accept the next multicast packet which is intended for the faster neighbors. Normal multicast resumes when the laggard neighbors catch up.

CR works by multicasting a special hello packet (sometimes called an unreliable hello packet because an ACK message is not returned by the recipient) to the neighbors. The unreliable hello packet has a variable-length data field holding data that indicates the addresses of the laggard neighbors and the sequence number of the next reliable multicast packet. The special unreliable hello packet is also called a sequenced hello. The next reliable multicast packet is sent with the CR bit set and has the same sequence number specified in the sequenced hello. This special reliable multicast packet is called a CR packet. The laggard neighbors that have the matching addresses specified in the sequenced hello discard the CR packet without further processing. The faster neighbors go into the CR mode and accept the CR packet. Unicast packets without the CR bit are sent to the laggard neighbors until the laggard neighbors catch up.

This mechanism works well in networks where a single router can reach all the neighbors attached to a single interface through a link that is similar in speed for each of those neighbors, and when these links are relatively lossless, and bandwidths are relatively high compared to the amount of routing information to be transferred.

However, on networks with a large number of neighbors, reachable through links with varying speeds, this system presents a number of problems, including the following.

(1) CR divides the neighbors into two subsets, a multicast subset and a unicast subset. This might not be efficient when there are many neighbors on an interface. The increased number of neighbors increases the range of travel times and increases the average travel time, thus increasing the value of the multicast flow timer. Many fast neighbors may be penalized by waiting too long for the multicast flow timer.

(2) However, if the flow timer is set at a smaller value, EIGRP frequently invokes the CR method and increases the number of laggard routers. When the number of laggard neighbors is large, unicasting the same routing information to many of them is not efficient. As EIGRP is required to support thousands of neighbors per interface, it clearly requires a more efficient delivery method.

(3) When there are many neighbors on an interface, the list of laggard neighbor addresses in the sequenced hello may become large. The interface maximum transmission unit (MTU), which specifies the maximum size of a data packet on an interface, may not be large enough for the sequenced hello to contain all needed neighbor addresses. EIGRP currently only supports an MTU of 1500 bytes which has enough room for less than 300 neighbor addresses. As a result, if the sequenced hello message would exceed 1500 bytes, EIGRP replicates a packet that indicates a sequence number to be ignored by a laggard neighbor and unicasts the packet to each laggard neighbor that has an address that is not included in the multicast sequenced hello.

(4) The large sequenced hello packets contribute to interface congestion and router load when processing long lists of neighbor addresses.

Based on the foregoing, there is a clear need for techniques to multicast routing information, which techniques do not suffer one or more deficiencies of past approaches. In particular, there is a need to reduce laggard neighbors of a sending node to fewer than 300 to properly implement CR in EIGRP and to reduce the congestion on a link caused by a large number of unicasts to laggard routers. There is also a particular need to increase the number of routers that are included in the multicast set under conditional receive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for sending data among multiple neighbors in a packet-switched communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of sending routing information for EIGRP within an autonomous system using a conditional receive (CR) mechanism to feed routing information to fast routers more rapidly than to slow routers. However, the invention is not limited to this context and protocol, but may be applied in any routing protocol that sends information to a large number of neighbors on a network segment without intervening intermediate network nodes.

1.0 Network Overview

Figure 1A:
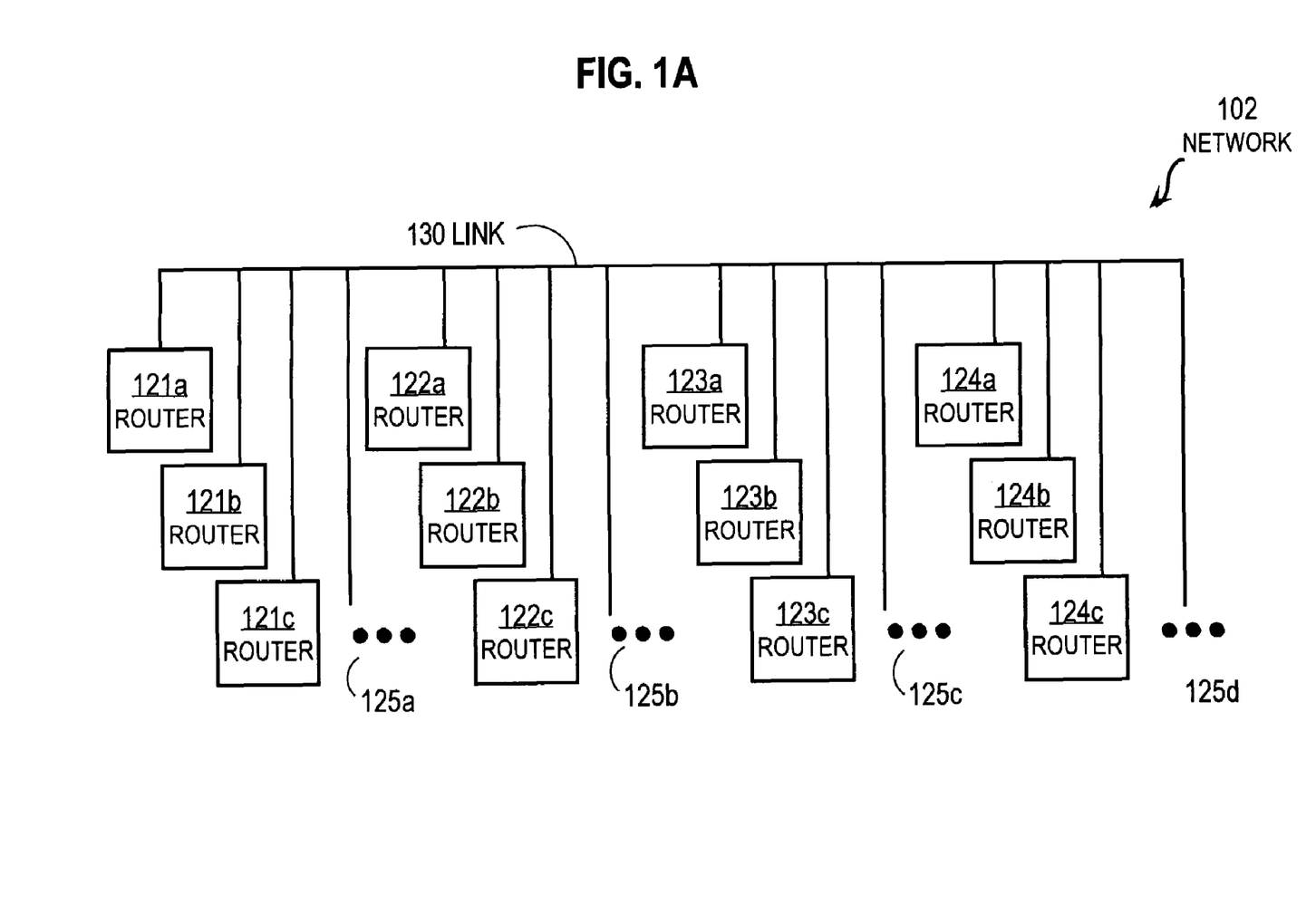
FIG. 1A is a block diagram that illustrates a portion of a network that includes a large number of neighboring routers, according to an embodiment.

FIG. 1A is a block diagram that illustrates a portion of a network 102 that includes a large number of neighboring routers, according to an embodiment. Network 102 includes a large number of intermediate network nodes: router 121a, router 121b, router 121c, router 122a, router 122b, router 122c, router 123a, router 123b, router 123c, router 124a, router 124b, router 124c and further routers represented by ellipses 125a, 125b, 125c, 125d, collectively referenced hereinafter as routers 120. The routers 120 are connected by communication links 130 on which there are no intervening intermediate network nodes (called a network segment). Thus routers 120 are neighbors. While a certain number of nodes 120 and links 130 are depicted in network 102 for purposes of illustration, in other embodiments, a network includes more or fewer nodes, such as routers and end nodes that are either neighbors or not neighbors of routers 120, and more or fewer links.

A message multicast by one neighbor, e.g., router 121a may incur a variable amount of cost to reach each of the other neighboring routers 120 on network segment made up of links 130. Cost can be measured in any manner known in the art including bandwidth, travel time, signal attenuation and susceptibility to noise, among others, or any combination of such factors. Due to noise or congestion on the segment, some routers may not receive the multicast at all For purposes of illustration it is assumed that the cost to reach a neighbor of router 121a is measured in round trip travel time, and increases with distance to the right from router 121a in FIG. 1A. It is assumed that all routers indicated by ellipses 125a are closer than router 122a to router 121a. Similarly, it is assumed that all routers indicated by ellipses 125b, 125c are closer than routers 123a, 124a, respectively, to router 121a.

When a reliable multicast is sent by router 121a to all its neighboring routers 120, the neighboring routers 120 return an ACK message. By timing the arrival of the ACK messages, router 121a can determine the round-trip travel time (RTT) to each neighboring router 120. By accumulating RTTs from several reliable multicast messages, the router 121a can determine a Smooth RTT (SRTT) for each neighboring router 120. The SRTT is defined as an exponentially decreasing weighted average, so that measured values of RTT are given progressively less influence as they increase.

As described in the background section, EIGRP determines a multicast flow time (MFT) based on the range of SRTT values for all the neighboring routers 120. For purposes of illustration, it is assumed that the MFT is set to a value that is greater than the SRTT of routers 125a but less than the SRTT of router 122a. It is further assumed that router 121a has 1000 neighbors, and that ellipses 125a, 125b, 125c, 125d represent 298 routers, 297 routers, 197 routers, and 197 routers, respectively. It is further assumed that MFT is one second.

Then, when router 121a determines to send a series of EIGRP update messages to its neighbors, it sends the first message in the series (e.g., with sequence number 123) in a reliable multicast over its interface to links 130. After the MFT of 1 second, for example, all routers from which router 121a did not receive an ACK message are listed in a sequenced hello message that also indicates the next sequence number of the next update message in the series (e.g., sequence number 14123). The router then attempts to send a sequenced hello multicast message that indicates sequence number 14123 and lists 700 routers that indicate routers 122a, and routers more distant than router 122a. The listed routers do not process the next update message in the series, e.g., with sequence number 14123. The router 121a then sends the next update message in the series in a reliable multicast to be processed just by those routers not listed in the sequenced hello (e.g., routers 121b through routers represented by ellipsis 125a).

As described in the background section, only 300 laggard routers can be listed and thus routers 123a through routers represented by ellipsis 125d are not notified that they are laggard and they attempt to process the second update message multicast. Some of them get the second update message out of sequence or otherwise without benefit of the first update message; and their attempts to update their routing tables are subject to error.

Even if all laggards can be notified, so there is no error in routers not being aware they are laggards, the method involves one multicast and up to 700 unicasts per message in the update message series. The multiple unicasts consume network resources, including bandwidth on the segment and processing power on router 121a.

Each of the neighboring routers 120 on the segment formed by links 130 in network 102 has a thousand neighbors and each of these routers face similar burdens in sending updates to its neighbors.

Figure 1B:
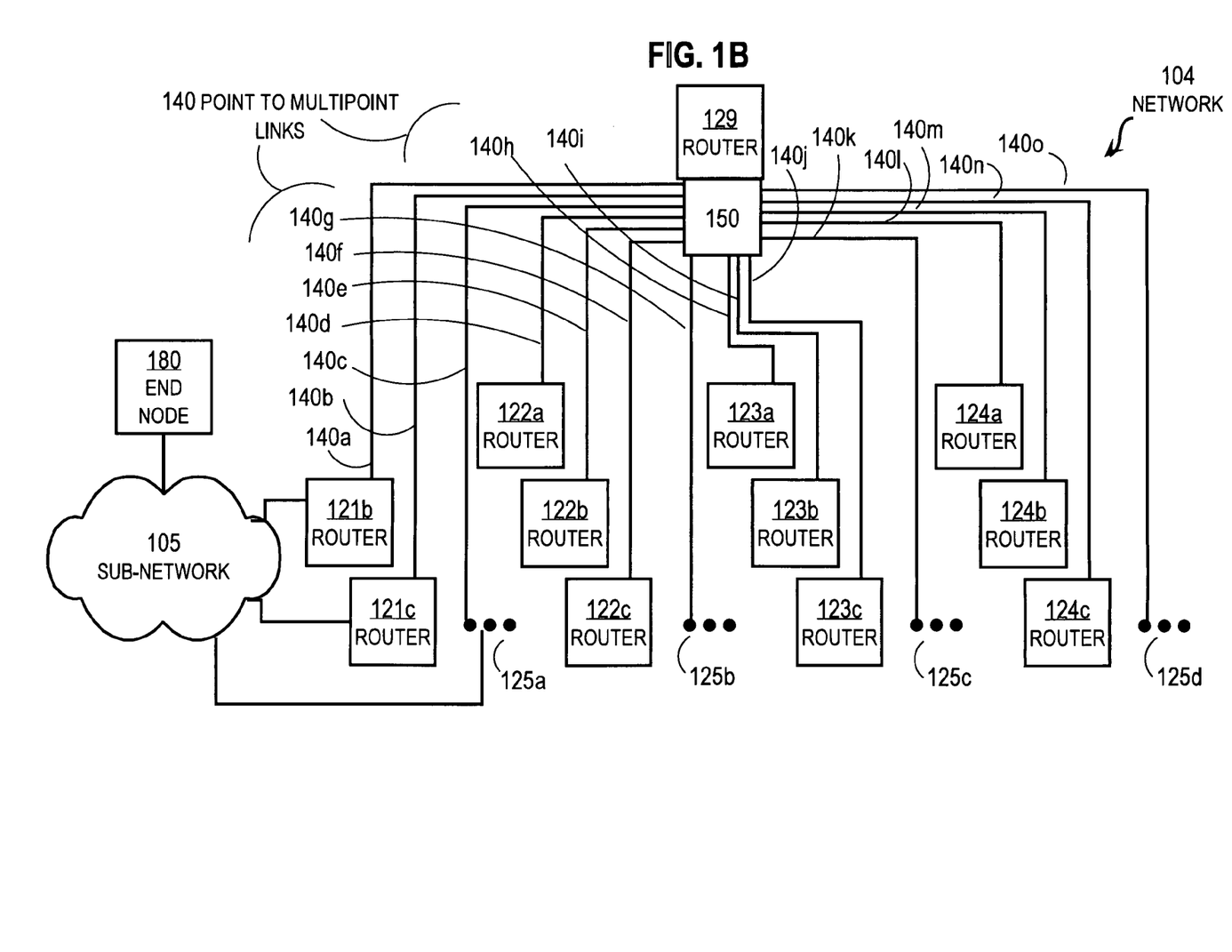
FIG. 1B is a block diagram that illustrates a portion of a network that includes a large number of neighboring routers on a point to multi-point link, according to an embodiment.

FIG. 1B is a block diagram that illustrates a portion of a network 104 that includes a large number of neighboring routers on a point to multi-point link, according to an embodiment. In network 104 router 121a of network 102 is replaced by router 129 with a point to multipoint interface 150. The links 130 are replaced by point to multipoint links 140 to the remaining routers 120 of network 102. In the illustrated embodiment, the point-to-multipoint links include link 140a, link 140b, link 140c, link 140d, link 140e, link 140f, link 140g, link 140h, link 140i, link 140j, link 140k, link 140l, link 140m, link 140n, and link 140o. Unlike network 102, in which each router 120 has a thousand neighbors, in network 104 only router 129 has a thousand neighbors. The other routers 120 each have just a few neighbors. Links 140 form a network segment. Network 104 also includes sub-network 105 connected to end node 180 and links between sub-network 105 and neighboring routers 121b, 121c, and routers indicated by ellipsis 125a. A point to multi-point interface is subject to the same routing multicast problems as described above for network 102.

According to illustrated embodiments of the invention, as described in more detail in the following sections, a router determines a minimum number (threshold) of fast routers to include in a CR multicast and does not send the CR multicast (and sequenced hello) until acknowledgements are received from that minimum number of neighbors.

2.0 Data Structures for Routing Information

Figure 2A:
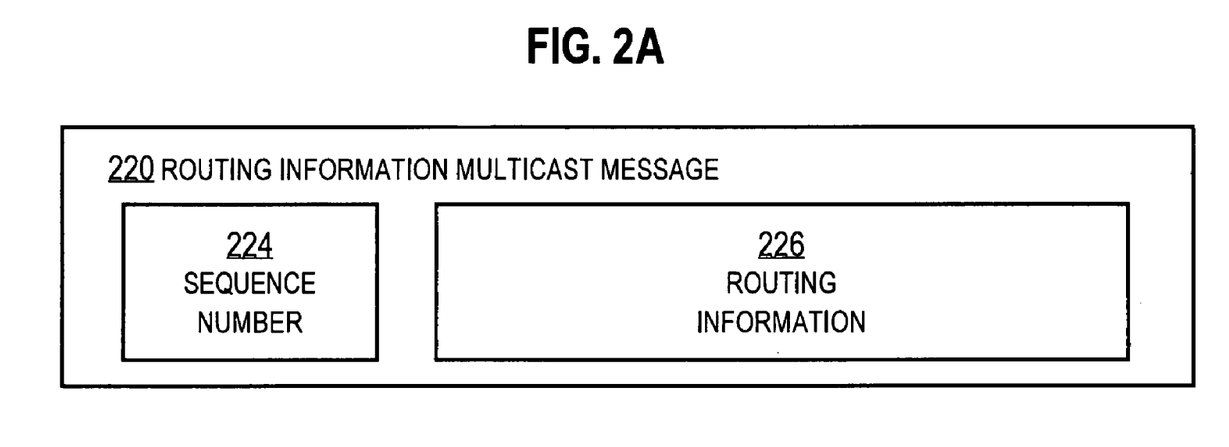
FIG. 2A is a block diagram that illustrates a control plane multicast message for a routing protocol, which provides routing information.

FIG. 2A is a block diagram that illustrates a control plane multicast message 220 for a routing protocol, which provides routing information in a multicast. Control plane message 220 includes a sequence number field 224, and a routing information field 226.

The sequence number field 224 holds data that indicates the order of the message 220 in a series of messages used to convey routing information, such as the cumulative number of bytes (1 byte typically equals 8 binary digits called bits) of the entire update included in the current message 220. It is often the case that all routing update information, for example, does not fit within the MTU limits of the routing protocols, and therefore several messages are sent to convey all the routing update information. The routing update information is properly processed in the order it is sent. The contents of the sequence number field ensure that the recipient router can determine the proper sequence for processing the routing update information and detect the loss of any bytes.

The routing information field 226 holds data that indicates the next portion of the routing information, such as a routing table update or a routing query.

Figure 2B:
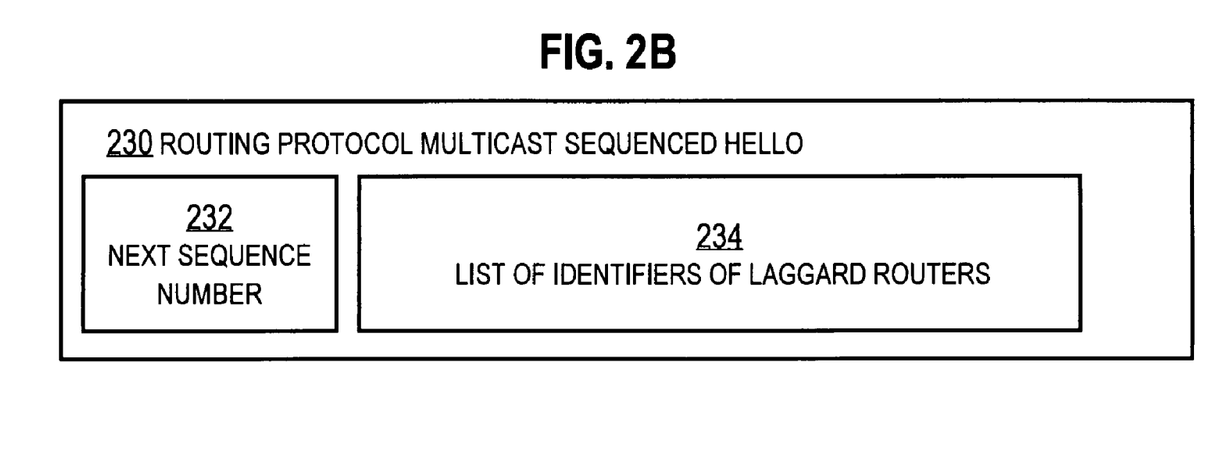
FIG. 2B is a block diagram that illustrates a control plane multicast message for a routing protocol, which indicates laggard routers which will not participate in conditional receiving of routing information beyond a given sequence number.

FIG. 2B is a block diagram that illustrates a control plane multicast message 230 for a routing protocol, which indicates laggard routers which will not process conditional routing information beyond a give sequence number, according to the sequenced hello message described in the background section. As described in the background section, message 230 includes a next sequence number field 232 and a list of identifiers of laggard routers field 234. The next sequence number field 232 holds data that indicates a sequence number that will not be processed by the laggard routers from a multicast. The list of identifiers of laggard routers field 234 is a variable length field that holds data that indicates identifiers, such as IP addresses, of routers that are not to process multicasts of routing information with sequence number indicated in field 232 or later sequence numbers.

Figure 2C:
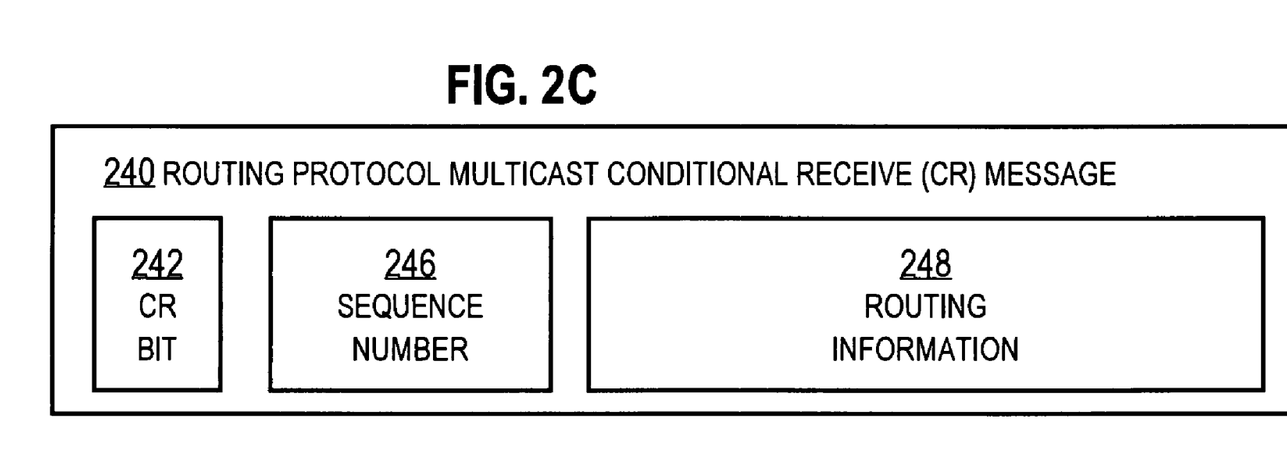
FIG. 2C is a block diagram that illustrates a control plane multicast message for a routing protocol, which includes routing information for conditional receipt by fast routers in a multicast.

FIG. 2C is a block diagram that illustrates a control plane multicast message 240 for a routing protocol, which includes routing information for conditional receipt by fast routers among the neighbors, according to an embodiment. Message 240 includes a CR bit field 242, a sequence number field 246 and a routing information field 248.

The CR bit field 242 holds a bit that indicates the multicast message is intended only for those neighbors in conditional receive mode, i.e., for those routers not listed in a sequenced hello message 240. The sequence number field 246 holds data that indicates the sequence number for the routing information included in the message 240; and is used by routers listed in a sequenced hello to determine whether to process this multicast message or not. The routing information field 248 holds data that indicates the next portion of the routing information, such as a routing table update or a routing query.

Figure 2D:
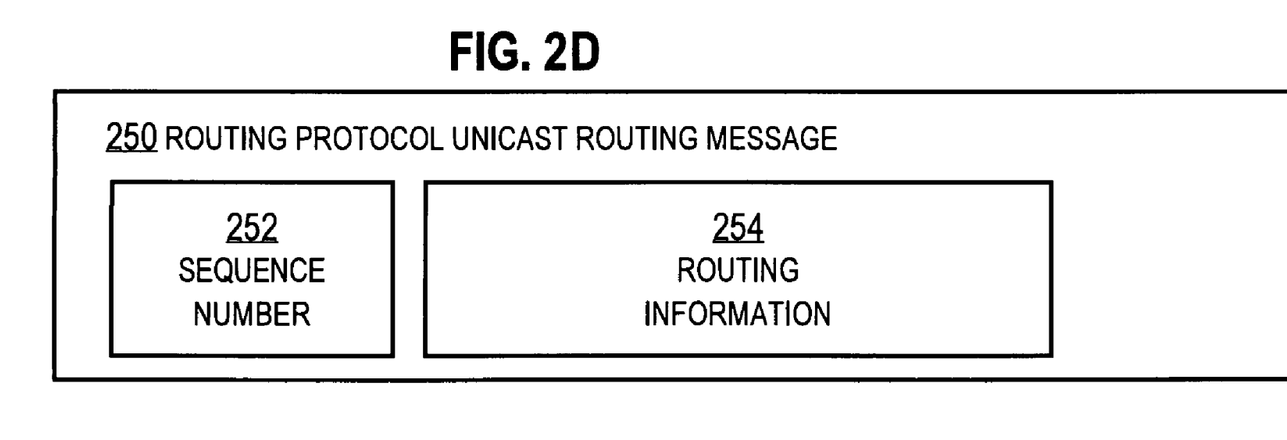
FIG. 2D is a block diagram that illustrates a control plane unicast message for a routing protocol, which includes routing information for receipt by a laggard router.

FIG. 2D is a block diagram that illustrates a control plane unicast message 250 for a routing protocol, which includes routing information for receipt by a laggard router. Message 250 is identical to unicasts currently used in EIGRP for laggard routers. Message 250 includes a sequence number field 252 and a routing information field 254.

The sequence number field 252 holds data that indicates the sequence number for the routing information included in the message 250; and typically repeats a sequence number used in a multicast message processed by more responsive routers. The routing information field 254 holds data that indicates the portion of the routing information missed by the laggard router, such as a portion of a routing table update or a routing query.

Figure 3:
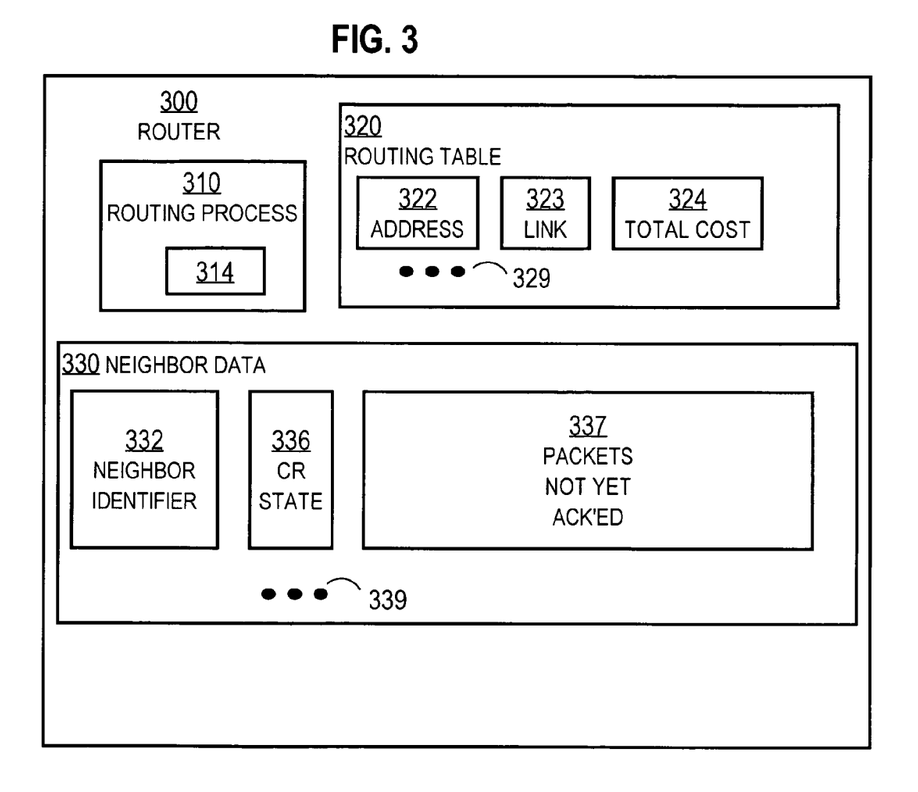
FIG. 3 is a block diagram that illustrates a router that uses the control plane messages depicted in FIG. 2A, 2B, 2C, 2D, according to an embodiment.

FIG. 3 is a block diagram that illustrates a router that uses the control plane messages depicted in FIG. 2A, 2B, 2C, 2D, according to an embodiment. Router 300 includes a routing process 310, a routing table 320 and a neighbor data structure 330.

The routing process 310 executes on a processor, such as a general purpose processor executing sequences of instructions that cause the processor to perform the routing process. According to embodiments of the invention, routing process includes process 314 to determine when to send a CR multicast as described in more detail below with respect to FIG. 4. The routing process 310 stores and retrieves information in the routing table 320 based on information received in one or more routing protocol update messages that are stored in routing protocol information data structures (including neighbor data structure 330 among others, not shown).

The routing table 320 is a data structure that includes for each destination that can be reached from the router 300, an address field 322, a link field 323 and zero or more attribute fields. In the illustrated embodiment, the attributes fields include a total cost field 324. The address field 322 holds data that indicates a destination address or range of addresses that can be reached by router 300, e.g., an IP address for end node 180. The link field 323 indicates a link on router 300 that is used as the next hop to reach the destination address indicated in field 322. For example, link 140*a* with router 121*b* is the link for the next hop from router 129 to end node 180 and data indicating link 140*a* is included in link field 323. The total cost field 324 holds data that indicates a cost metric to reach the destination address from router 300. Fields for other destinations in routing table 320 are indicated by ellipsis 329.

The neighbor data structure 330 is a data structure that holds data that describes each neighbor of the router 300. In the illustrated embodiment, neighbor data structure 330 includes, for each neighbor, a neighbor identifier field 332, a CR state field 336, and information packets not yet acknowledged field 337. In some embodiments, other data fields (not shown) are also associated with each neighbor. Fields for other neighbors are indicated by ellipsis 339.

The neighbor identifier field 332 holds data that indicates a particular neighboring router, e.g., an IP address for that particular neighbor. The CR state field 336 holds data that indicates whether the neighbor is in a conditional receive (CR) state for receiving multicasts not received by laggard routers in the same subset.

The information packets not yet acknowledged field 337 holds data that indicates a queue of routing information and sequence numbers that have been sent to but not yet acknowledged by the particular neighbor indicated in field 332. In various embodiments, the queue itself, or a pointer to a memory location that contains the queue, is included in field 337. If not acknowledged in time, the data in this queue is unicast to that neighbor, as described in the background section.

Data structures may be formed in any method known in the art, including using portions of volatile memory, or non-volatile storage on one or more nodes, in one or more files or in one or more databases accessed through a database server, or some combination. Although data structures 320, 330 are shown as integral blocks with contiguous fields in a particular order for purposes of illustration, in other embodiments one or more portions of fields and data structures 320, 330 are stored as separate data structures in the same or different order on the same or different multiple nodes that perform the functions of router 300.

According to various embodiments of the invention, router 300 sends routing data to neighbors in one or more CR multicasts in order to reduce the number of laggard routers, reduce the size of sequenced hello messages, reduce the number of unicast messages to bring laggard routers up to date, or reduce the waste of network resources to send queries, or some combination.

3.0 Method for Determining when to Send CR Multicast

Figure 4:
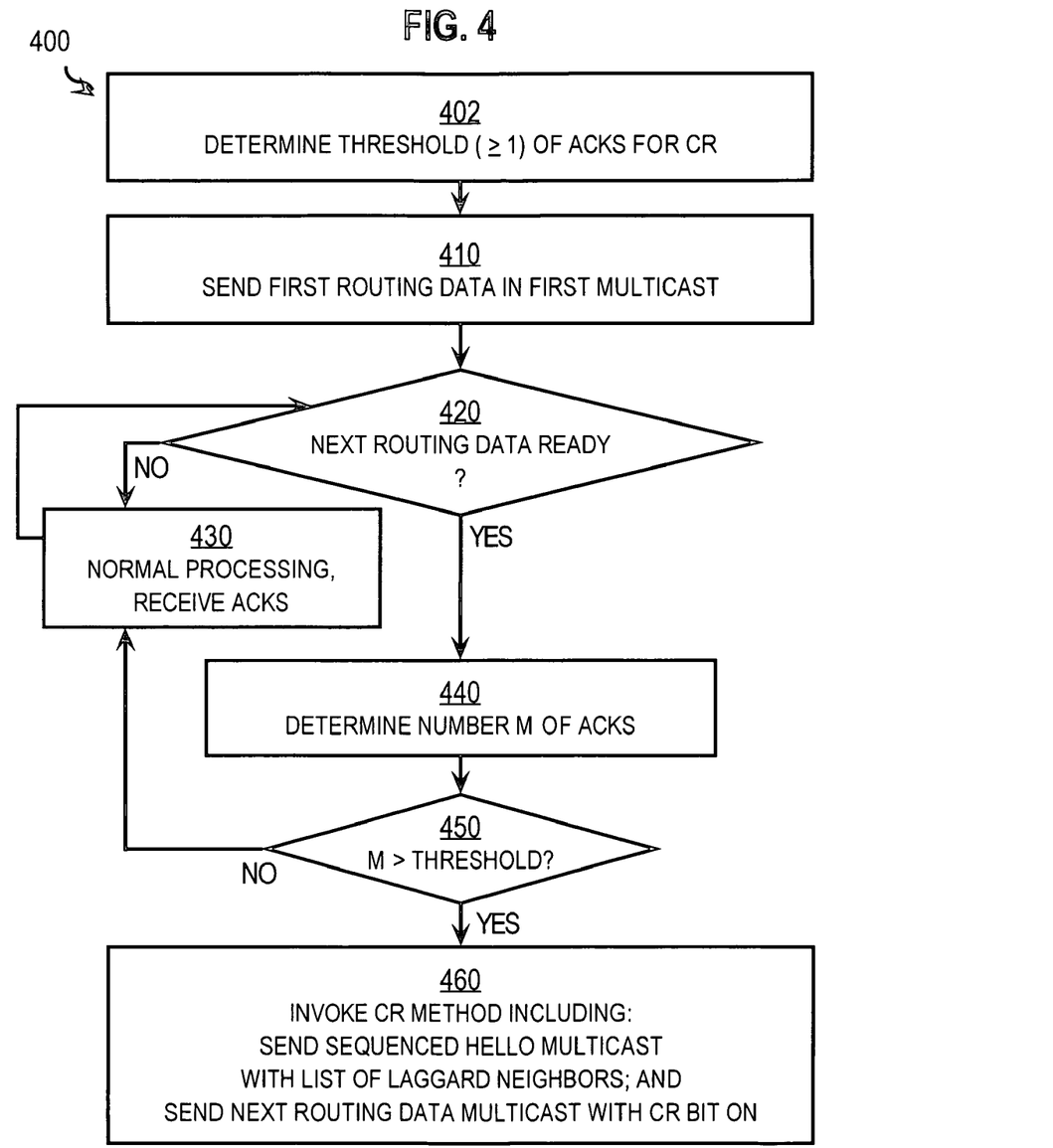
FIG. 4 is a flow diagram that illustrate at a high level a method for sending routing data, according to an embodiment.

FIG. 4 is a flow diagram that illustrates at a high level a method 400 for sending routing data, according to an embodiment. Although steps in FIG. 4 are shown in a particular order for purposes of illustration, in other embodiments one or more steps may be performed in a different order or overlapping in time, or one or more steps may be omitted or added, or some combination of changes may be made.

In step 402, a threshold is determined for the number of acknowledgement (ACK) messages to be received before invoking the CR method. In the current implementation of EIGRP, for example, the CR method is invoked even if only one neighbor has sent an ACK message by the end of the MFT. According to various embodiments of the invention, the threshold is sent higher than this, requiring more than one neighbor that has responded with an ACK message. In various embodiments, the threshold is set at various values greater than one.

An appropriate threshold is easily determined by experiment. According to experiments performed by applicants, it has been determined that performance is noticeably better if the threshold is set at a percentage near 50% of the total neighbors. In other embodiments, other percentages are anticipated to provide appreciably better performance than requiring only one neighbor to acknowledge the multicast. In such embodiments, step 402 includes determining N, the number of neighbors for the intermediate network node.

In some embodiments, the threshold is set based on the maximum number (Lmax) of neighbors that can be individually identified in a sequenced hello broadcast, e.g., by IP addresses. For example, the threshold is set so that the number of laggards is no greater than Lmax. For a node with N neighbors, the threshold is set at N−Lmax−1. (The "−1" term is included because, as is described in more detail below, in the illustrated embodiment the number of ACKs must exceed the threshold before the CR method is invoked.) In some embodiments, the MTU of the control plane message is set at 1500 bytes, which corresponds to IPv4 addresses for up to 300 neighbors, so Lmax is 300. In some embodiments, the MTU is greater (for example because multiple packets or Giant or Jumbo Ethernet packets are used to send the sequenced hello) and thus Lmax is greater than 300.

For purposes of illustration, two example embodiments are described herein. In both examples the number of neighbors, N, equals 1000. In a first example, the threshold is set at 50% of N, equal to 500. In the second example, the threshold is set based on an Lmax of 300. In this embodiment, the threshold is 1000−300−1 and equals 699.

In step 410, the first routing data is sent in a first multicast. For example, a first routing information multicast message 220 with sequence number 123 in field 224 is sent in an IP data packet with a destination IP address holding data that indicates multicast. An IPv4 address is represented by four decimal values, each between 0 and 255, separated by periods. The IP multicast destination address is an address in the range from 224.0.0.0 to 224.0.0.255.

In step 420 it is determined whether the next routing data is ready to send. Any method may be used to determine when the next routing data is ready to send. In some embodiments, the next routing data is ready to send as soon as another message 220 is formed. In some embodiments, the next routing data message is ready when both the next message 220 is formed and a MFT time has passed.

If it is determined in step 420 that the next routing data is not ready to send, control passes to step 430. In step 430, other processing is performed and any acknowledgement messages are received from neighbors that received the first multicast. Normal processing includes performing other steps (not shown) of the routing process 310. Control passes ultimately back to step 420. In some embodiments, step 430 includes incrementing a counter every time an ACK is received for the first multicast (as indicated by a sequence number in the ACK message.)

If it is determined in step 420 that the next routing data is ready to send, control passes to step 440. In step 440, the number of acknowledgments of the first multicast message is determined. Any method may be used to determine this number M. For example, in some embodiments, the number M is determined by polling the field 337 in the neighbor data 330 to determine how many do not list the sequence number of the first multicast. In some embodiments, M is determined from a counter incremented during step 430, as described above. Control then passes to step 450. For purposes of illustration, it is assumed that after an MFT of 1 second, M is 600.

In step 450, it is determined whether M exceeds the threshold. If not, control passes back to step 430 to continue do normal processing and accumulate ACK messages. Control then passes back to steps 420, 404, and 450. This loop is equivalent to waiting until M exceeds the threshold. If it is determined in step 450 that M does exceed the threshold, then control passes to step 460 to invoke CR.

In the first example embodiment, the threshold is 50% of 1000=500. 600 exceeds 500, so after 1 second, control passes to step 460 to invoke CR with 600 neighbors receiving the multicast and 400 IP addresses listed as laggard neighbors. In the second example embodiment, the threshold is N−Lmax−1=699. 600 does not exceeds 699, so after the 1 second MFT, control passes back to step 430 to wait until another 99 ACK messages are received. It is assumed for purposes of illustration that this takes another 0.7 seconds.

In step 460, the CR method is invoked. Step 460 includes sending a routing protocol multicast sequenced hello 230 with 14123 in the next sequence number field 232 and a list of laggard IP addresses in field 234. Step 460 also includes sending a routing protocol multicast CR message 240 with the CR bit 242 set, the sequence number field 246 holding data that indicates 14123, and the field 248 including data that indicates routing information for the update or query. After a re-send time, step 460 includes sending a series of routing protocol unicast routing messages 250, with sequence number of 123 in field 252 and the routing information from the first multicast in field 254, to all those laggard neighbors that did not send ACK messages before the expiration of the re-send time. Step 460 also includes sending a series of routing protocol unicast routing messages 250 to the laggard neighbors, with sequence number of 14123 in field 252 and the routing information from the second multicast in field 254.

In the first example embodiment, step 460 includes sending a routing protocol multicast sequenced hello 230 with 14123 in the next sequence number field 232 and a list of 400 laggard IP addresses in field 234. Such a multicast is possible if the protocol allows multiple data packets to be sent or if the MTU is sufficiently increased by use of a Giant or Jumbo Ethernet frame. Step 460 also includes sending a routing protocol multicast CR message 240 with the CR bit 242 set, the sequence number field 246 holding data that indicates 14123, and the field 248 including data that indicates routing information for the update or query. If it is assumed for purposes of illustration that 300 ACK messages are received between the sequenced hello and a re-send time (say 5 seconds), then, after 5 seconds, step 460 includes sending 100 routing protocol unicast routing messages 250, with sequence number of 123 in field 252 and the routing information from the first multicast in field 254, to all those laggard neighbors that did not send ACK messages before 5 seconds. Step 460 also includes sending 400 routing protocol unicast routing messages 250 to the laggard neighbors, with sequence number of 14123 in field 252 and the routing information from the second multicast in field 254.

In the second example embodiment, step 460 includes sending a routing protocol multicast sequenced hello 230 with 14123 in the next sequence number field 232 and a list of 300 laggard IP addresses in field 234. Such a multicast is possible even for an MTU of 1500 bytes in current implementations of EIGRP. Step 460 also includes sending a routing protocol multicast CR message 240 with the CR bit set, the sequence number field 246 holding data that indicates 14123, and the field 248 including data that indicates routing information for the update or query. If it is assumed for purposes of illustration that 200 ACK messages are received between the sequenced hello and a re-send time (say 5 seconds), then, after 5 seconds, step 460 includes sending 100 routing protocol unicast routing messages 250, with sequence number of 123 in field 252 and the routing information from the first multicast in field 254, to all those laggard neighbors that did not send ACK messages before 5 seconds. Step 460 also includes sending 300 routing protocols unicast routing messages 250 to the laggard neighbors, with sequence number of 14123 in field 252 and the routing information from the second multicast in field 254.

Using method 400, tests have shown that network segments with more than 2000 peers perform well, substantially better than segments with a minimum number of responding neighbors of just 1 before invoking CR, as in the current EIGRP.

4.0 Implementation Mechanisms—Hardware Overview

Figure 5:
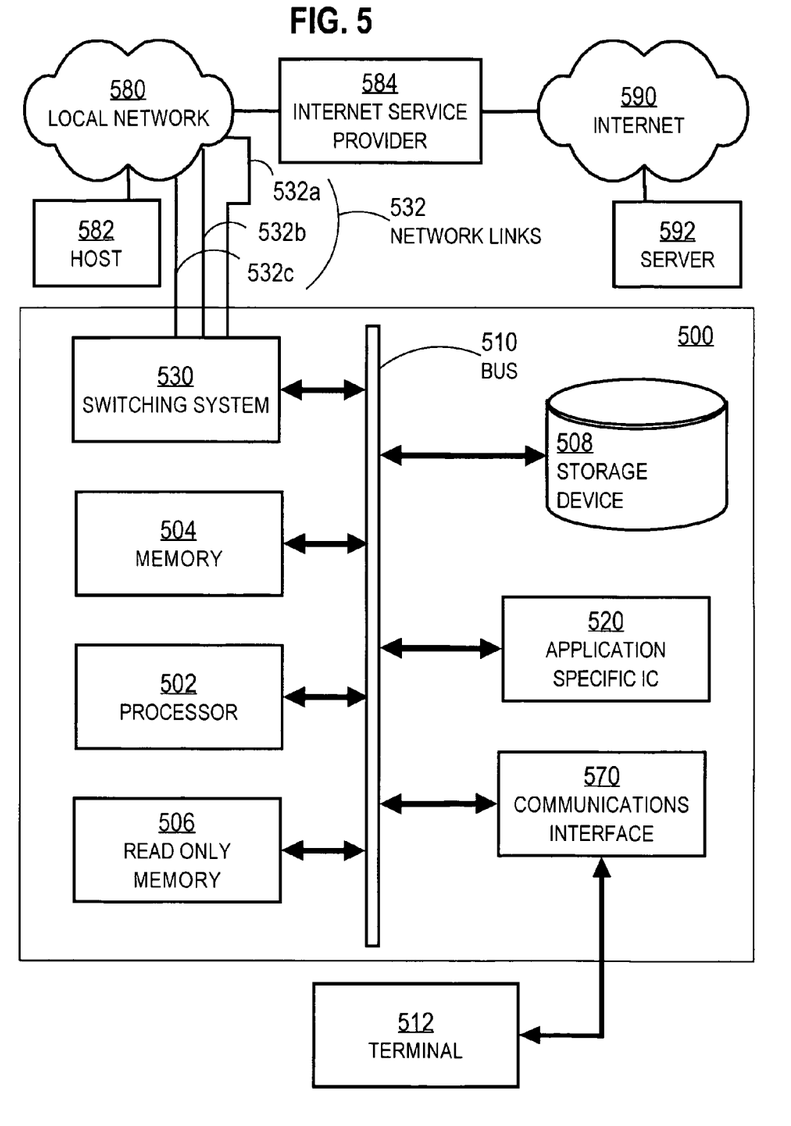
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532*a*, 532*b*, 532*c* are included in network links 532 in the illustrated embodiment, in other embodiments, more or fewer links are connected to switching system 530. Network links 532 typically provides information communication through one or more networks to other devices that use or process the information. For example, network link 532*b* may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532*a*, as output on the same or different network link, e.g., 532*c*. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532*a* and send it to the correct destination using output interface on link 532*c*. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sending routing data in a packet-switched communications network, comprising the steps of:
    sending first routing data in a first multicast data packet from a particular network node, through one or more interfaces on the particular network node, to a plurality, of a number N, of adjacent network nodes of a packet-switched communications network, which adjacent network nodes communicate without intervening network nodes with the particular network node;
    determining whether different second routing data for the plurality of N adjacent network nodes is ready to be sent in a different second multicast data packet; and
    if it is determined that the different second routing data is ready to be sent, then performing the steps of:
        determining a number M of adjacent network nodes from each of which has been received through the one or more interfaces an acknowledgment message that acknowledges the first multicast data packet;
        determining whether M exceeds a threshold value;
        if it is determined that M does exceed the threshold value, then invoking a Conditional-Receive (CR) method that includes the step of sending a multicast message identifying a number L=N−M of laggard adjacent network nodes from which acknowledgement messages have not been received, wherein the laggard adjacent network nodes ignore the different second multicast data packet; and
        if it is determined that M does not exceed the threshold value, then waiting to receive one or more additional acknowledgement messages that acknowledge the particular multicast data packet until M does exceed the threshold value before invoking the CR method,
    wherein the threshold value is greater than or equal to 1.

2. A method as recited in claim 1, wherein the threshold value is a particular percentage of N.

3. A method as recited in claim 2, wherein the threshold value is substantively 50% of N.

4. A method as recited in claim 1, wherein:
    a maximum number of laggard adjacent network nodes that can be identified in one multicast message during the CR method is Lmax; and
    the threshold value is not less than N−Lmax−1.

5. A method as recited in claim 4, wherein Lmax is substantively equal to 300.

6. An apparatus for sending routing data in a packet-switched communications network, comprising:
    means for sending first routing data in a first multicast data packet from a particular network node, through one or more interfaces on the particular network node, to a plurality, of a number N, of adjacent network nodes of a packet-switched communications network, which adjacent network nodes communicate without intervening network nodes with the particular network node;
    means for determining whether different second routing data for the plurality of N adjacent network nodes is ready to be sent in a different second multicast data packet; and
    means for, if it is determined that the different second routing data is ready to be sent, then performing the steps of determining a number M of adjacent network nodes from each of which has been received through the one or more interfaces an acknowledgment message that acknowledges the first multicast data packet; determining whether M exceeds a threshold value; and, if it is determined that M does exceed the threshold value, then invoking a Conditional-Receive (CR) method that includes the step of sending a multicast message identifying a number L=N−M of laggard adjacent network nodes from which acknowledgement messages have not been received, wherein the laggard adjacent network nodes ignore the different second multicast data packet; and, if it is determined that M does not exceed the threshold value, then waiting to receive one or more additional acknowledgement messages that acknowledge the particular multicast data packet until M does exceed the threshold value before invoking the CR method,
    wherein the threshold value is greater than or equal to 1.

7. An apparatus for sending routing data in a packet-switched communications network, comprising:
    one or more network interfaces coupled to a network for communicating therewith a first data packet;
    one or more processors;
    a computer-readable medium; and
    one or more sequences of instructions stored in the computer-readable medium,
        which, when executed by the one or more processors, causes the one or more processors to carry out the steps of:
            sending first routing data in a first multicast data packet through the one or more interfaces to a plurality, of a number N, of adjacent network nodes of the network without intervening network nodes;
            determining whether different second routing data for the plurality of N adjacent network nodes is ready to be sent in a different second multicast data packet; and
            if it is determined that the different second routing data is ready to be sent, then performing the steps of:
                determining a number M of adjacent network nodes from each of which has been received through the one or more network interfaces an acknowledgment message that acknowledges the first multicast data packet;
                determining whether M exceeds a threshold value;
                if it is determined that M does exceed the threshold value, then invoking a Conditional-Receive (CR) method that includes the step of sending a multicast message identifying a number L=N−M of laggard adjacent network nodes from which acknowledgement messages have not been received, wherein the laggard adjacent network nodes ignore the different second multicast data packet; and
                if it is determined that M does not exceed the threshold value, then waiting to receive one or more additional acknowledgement messages that acknowledge the particular multicast data packet until M does exceed the threshold value before invoking the CR method,
    wherein the threshold value is greater than or equal to 1.

8. An apparatus as recited in claim 7, wherein the threshold value is a particular percentage of N.

9. An apparatus as recited in claim 8, wherein the threshold value is substantively 50% of N.

10. An apparatus as recited in claim 7, wherein:
    a maximum number of laggard adjacent network nodes that can be identified in one multicast message during the CR method is Lmax; and
    the threshold value is not less than N−Lmax −1.

11. An apparatus as recited in claim 10, wherein Lmax is substantively equal to 300.

12. A computer-readable volatile or non-volatile medium, carrying one or more sequences of instructions for sending routing data in a packet-switched communications network, wherein execution of the one or more sequences of instructions by one or more processors causes the one or more processors to perform the steps of:

sending first routing data in a first multicast data packet from a particular network node, through one or more interfaces on the particular network node, to a plurality, of a number N, of adjacent network nodes of a packet-switched communications network, which adjacent network nodes communicate without intervening network nodes with the particular network node;

determining whether different second routing data for the plurality of N adjacent network nodes is ready to be sent in a different second multicast data packet; and     if it is determined that the different second routing data is ready to be sent, then performing the steps of:

determining a number M of adjacent network nodes from each of which has been received through the one or more interfaces an acknowledgment message that acknowledges the first multicast data packet;

determining whether M exceeds a threshold value;

if it is determined that M does exceed the threshold value, then invoking a Conditional-Receive (CR) method that includes the step of sending a multicast message identifying a number $=N-M$ of laggard adjacent network nodes from which acknowledgement messages have not been received, wherein the laggard adjacent network nodes ignore the different second multicast data packet; and         if it is determined that M does not exceed the threshold value, then waiting to receive one or more additional acknowledgement messages that acknowledge the particular multicast data packet until M does exceed the threshold value before invoking the CR method,     wherein the threshold value is greater than or equal to 1.

13. A computer-readable medium as recited in claim 12, wherein the threshold value is a particular percentage of N.

14. A computer-readable medium as recited in claim 13, wherein the threshold value is substantively 50% of N.

15. A computer-readable medium as recited in claim 12, wherein:

a maximum number of laggard adjacent network nodes that can be identified in one multicast message during the CR method is Lmax; and     the threshold value is not less than $N-Lmax-1$.

16. A computer-readable medium as recited in claim 15, wherein Lmax is substantively equal to 300.

* * * * *